United States Patent [19]
Wilkerson

[11] Patent Number: 4,733,842
[45] Date of Patent: Mar. 29, 1988

[54] MULTI-PURPOSE CLAMP

[76] Inventor: William W. Wilkerson, 1610 Gershwin Ave., St. Paul, Minn. 55119

[21] Appl. No.: 904,552

[22] Filed: Sep. 5, 1986

[51] Int. Cl.⁴ .............................................. A47B 96/06
[52] U.S. Cl. .................... 248/231.5; 24/495; 24/514; 248/316.5; 269/239
[58] Field of Search ............ 248/231.5, 231.2, 225.31, 248/220.2, 316.5; 24/495, 514; 268/239

[56] References Cited

U.S. PATENT DOCUMENTS

| | | | |
|---|---|---|---|
| 457,997 | 8/1891 | Lorey | 269/223 X |
| 504,652 | 9/1893 | Bailey | 269/239 |
| 581,991 | 5/1897 | Homan | 24/514 |
| 585,406 | 6/1897 | Rhind | 24/514 X |
| 790,117 | 5/1905 | Erickson | 269/239 |
| 2,452,271 | 10/1948 | Sweet | 269/239 X |
| 2,645,034 | 7/1953 | Hupp | 248/225.31 X |
| 2,935,314 | 5/1960 | Ford . | |
| 2,950,836 | 8/1960 | Murdock | 248/229 X |
| 2,988,310 | 6/1961 | Wright | 248/229 X |
| 2,990,152 | 6/1961 | Whitney | 248/231.5 |
| 3,736,629 | 6/1973 | Blake | 269/221 X |
| 4,225,104 | 9/1980 | Larson | 248/316.5 X |
| 4,352,476 | 10/1982 | Meeks . | |
| 4,371,138 | 2/1983 | Roberts . | |
| 4,445,657 | 5/1984 | Breckenridge | 248/316.5 X |
| 4,619,447 | 10/1986 | Blake | 24/514 X |

Primary Examiner—Ramon O. Ramirez
Attorney, Agent, or Firm—Merchant, Gould, Smith, Edell, Welter & Schmidt

[57] ABSTRACT

A multi-purpose clamp for clamping an attachment to a support structure. This clamp consists of a first rigid panel with two edges, a second rigid panel hingedly attached to the first edge of the first rigid panel, a third rigid panel hingedly attached to the second edge of the first rigid panel, a threaded sleeve and rod for changing the angular orientation of the second rigid panel with respect to the third rigid panel and opposing grips located on the faces of both second and third rigid panels.

15 Claims, 8 Drawing Figures

MULTI-PURPOSE CLAMP

TECHNICAL FIELD

The present invention relates to a multi-purposed clamp for clamping to the edge of a support structure. More particularly, the invention relates to a multi-purpose clamp which clamps an attachment to a support structure for convenient use of the attachment.

BACKGROUND OF INVENTION

Several devices are already known which adjustably grasp bodies of different sizes. These devices include a hinge or pivot mechanism to attach an arm to a base and a threaded rod for varying the distance between the arms. For example, U.S. Pat. No. 504,652 discloses a vise and bench hook with a base block secured by a bolt to a table leg. The vise jaws, attached by hinges to the base block extend vertically. A transverse screw connects the vise jaws to adjust the distance between the jaws.

Similarly, U.S. Pat. No. 790,117 illustrates a vise with a fixed jaw with a lateral arm to which the bottom of an opposing jaw is pivotably attached. Also, U.S. Pat. No. 2,452,271 shows a leather vise composed of a base section with two vertical arms, only one of which is attached by a hinge. A combination bolt and coiled compression spring draws the hinged arm toward the fixed arm. However, none of these inventions demonstrate the use of hinged clamping jaws which clamp the surface at three (or more) points in three different planes to affix an attachment to a support structure, such as a wall or door frame.

A few clamping devices do provide support for a useful apparatus through a clamping action. For example, U.S. Pat. No. 2,950,836 shows a device for attaching an ashtray to a leg of a piece of furniture, and U.S. Pat. No. 2,988,310 depicts a beach umbrella support. Both of these patents disclose an adjustable clamp consisting of a U-shaped frame. The '836 patent discloses a clamp having one adjustable member on the inside. Turning a wing nut causes the adjustable member to move toward the opposing side of the U-frame. The '310 patent shows a clamp which works in the same fashion as the clamp shown in the '836 patent, except that it has two opposing adjustable members which are adjusted independently of each other. Neither of these patents discloses hinged arms or a single transverse rod to adjust the clamp's grip. There is thus a need for improved clamps.

SUMMARY OF THE INVENTION

The present invention, however, securely clamps a surface at three (or more) points in three different planes through the use of adjustable hinged panels. Additionally, this multi-purpose clamp provides support for a useful apparatus separate from its clamping function. Other significant advantages of the present invention include a turntable mechanism that allows the attachment to be oriented to a desired position for convenient use. The chosen orientation is then secured by a locking mechanism.

The present invention provides a multi-purpose clamp for clamping an attachment, such as a back massager, to the edge of a support structure, for instance, a wall or door frame. This multi-purpose clamp includes a first rigid panel having two edges. A second and third rigid panel are hingedly attached to these edges. An adjusting means is included to alter the angular orientation of the second rigid panel with respect to the third rigid panel. Finally, opposing grips to better grasp the surface of the support structure are located on the faces of the second and third rigid panels.

BRIEF DESCRIPTION OF THE DRAWINGS

The present invention may be more fully understood from the description set forth below of the preferred embodiment of the invention together with the accompanying drawings.

DETAILED DESCRIPTION OF THE INVENTION

During the following description, reference will be made to the drawings. The same numerals will be used throughout the several views to indicate the same or like parts of the invention.

Figure 1:
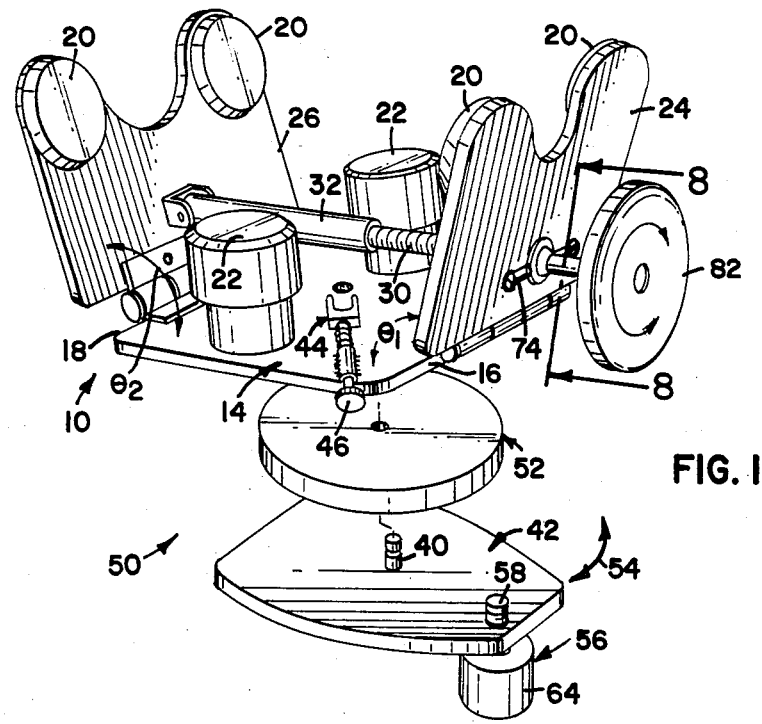
FIG. 1 is an exploded perspective view of the preferred embodiment of the invention.

Referring now to FIG. 1, a multi-purpose clamp 10 for clamping to a support structure 12 (see FIG. 3) according to the present invention includes a first rigid panel 14 having a first edge 16 and a second edge 18. A second rigid panel 24 is hingedly attached to the first edge 16 of the first rigid panel 14. Similarly, a third rigid panel 26 is hingedly attached to the second edge 18 of the first rigid panel 14. To better grasp the surfaces of the support structure, opposing grips 20 are attached to the faces of the second and third rigid panels 24 and 26, respectively. Stops 22 are attached to the face of the first rigid panel 14 which extend above a threaded rod 30 and a sleeve 32 to prevent the support structure from touching the adjusting mechanism, as will be described below.

Figure 5:
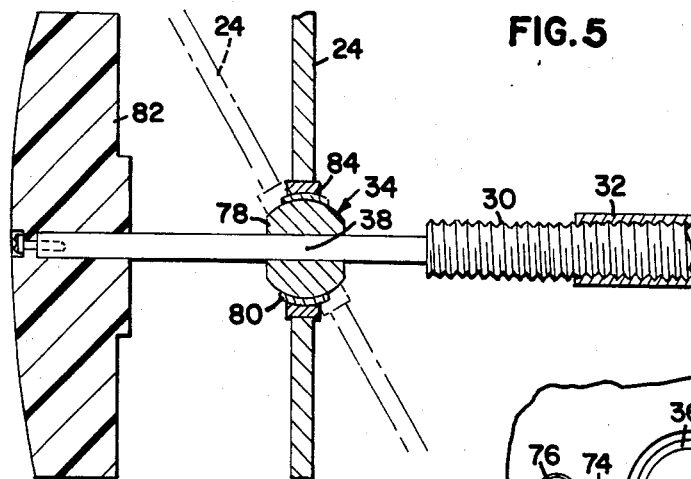
FIG. 5 is an enlarged detailed sectional view as seen generally along line 5—5 of FIG. 2.
Figure 8:
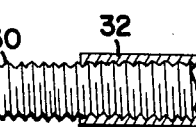
FIG. 8 is a partial sectional view taken generally along line 8-8 in FIG. 1.

To create a clamping action, an adjusting means or mechanism is provided. The adjusting means consists chiefly of the threaded sleeve 32 hingedly affixed to the third rigid panel 26 and engaging the threaded rod 30 pivotally attached to the second rigid panel 24. FIGS. 5 and 8 more particularly illustrate the cooperation of the adjusting means with the second rigid panel 24. At the place where the adjusting mechanism passes through the second rigid panel 24, a stop means such as a gimbel 34 or pivoting thrust bearing 36 is positioned. This structure allows the second rigid panel 24 to move pivotally about a point 38 on the length of the threaded rod 30 while the rod 30 is allowed to twist or turn about its axis.

The adjusting means changes the angular orientation of the second rigid panel 24 with respect to the third rigid panel 26 from a first position wherein the sum of the opposing angles theta 1, located between the second rigid panel 24 and the first rigid panel 14, and theta 2, located between the third rigid panel 26 and the first rigid panel 14, is substantially greater than 180°, to a second position wherein the sum of the opposing angles theta 1 and theta 2 is substantially less than 180°. In this way the clamp can grasp support structures of differing widths as the opposite opposing grips move together.

To mount a chosen attachment to the clamp, a protruding notched pin 40 is affixed to an attachment plate 42 and engages a spring-loaded clip 44 mounted on the face of the first rigid panel 14. Specifically, when the spring-loaded clip 44 is drawn back by a force exerted on handle 46, the notched pin 40 can penetrate the first rigid panel 14. The clip 44 is then released to grasp the pin 40 and consequently, connect the attachment plate 42 to the clamp 10. The notched pin/clip combination of this embodiment serves as a mounting means and allows different attachments to be interchangably used with the clamp.

Additionally, this embodiment includes a turntable mechanism 50. When the notched pin 40 engages the spring-loaded clip 44, a turntable is created between a cushioning pad 52, possibly made of teflon or nylon and the attachment plate 42. After the attachment plate is placed in the desired position by rotating the turntable mechanism 50 (see arrow 54), a locking mechanism 56, such as a threaded screw 58, secures the position of the attachment plate 42 to the first rigid panel 14. When tightened, the locking mechanism of this embodiment is in contact with the back surface of the first rigid panel 14. The device can also be advantageously constructed so that the pad 52 is permanently affixed to the first rigid panel 14 and the screw 58 engages the pad 52. The pad 52 and the attachment plate 42 can be made of any convenient shape and size.

Figure 2:
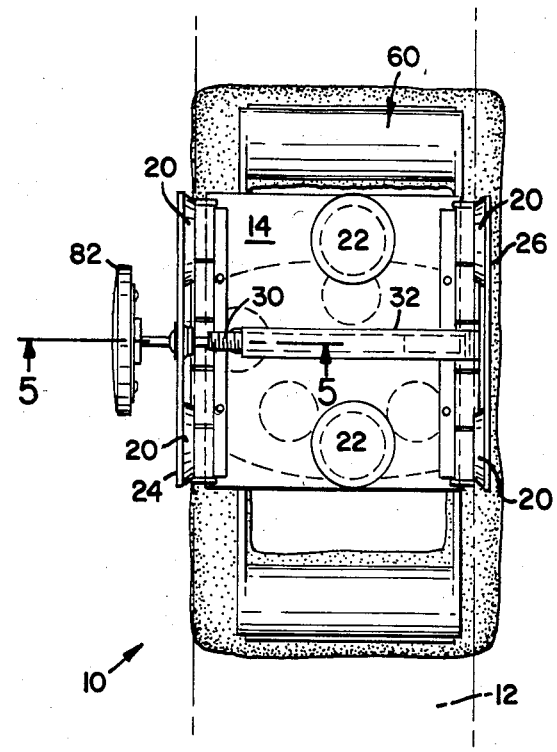
FIG. 2 is a plan view showing an alternative embodiment of the invention
Figure 3:
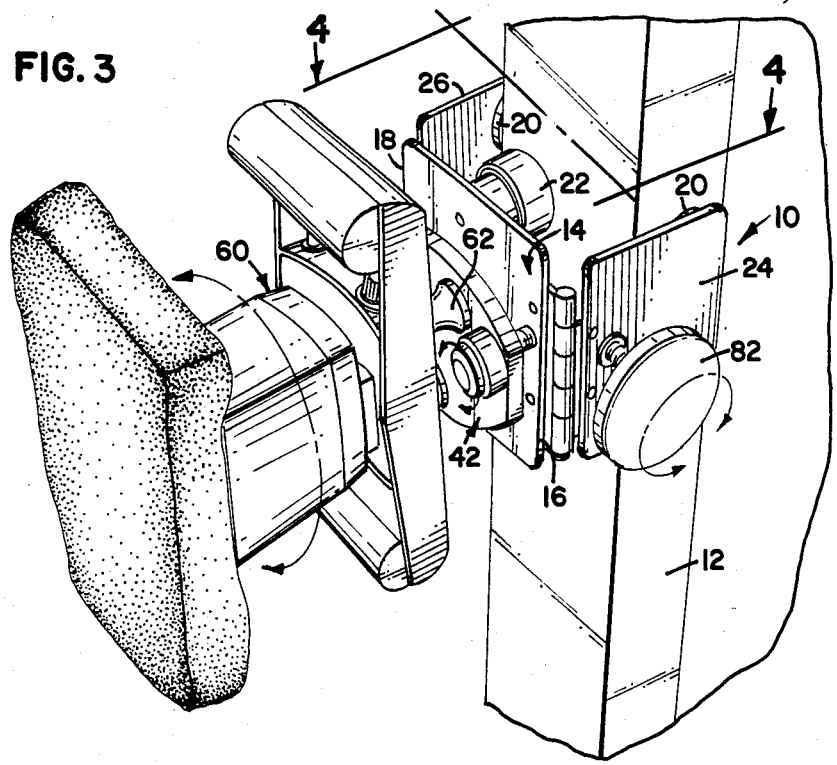
FIG. 3 is a perspective view of the multi-purpose clamp, with a back massager, clamped to a door frame.
Figure 4:
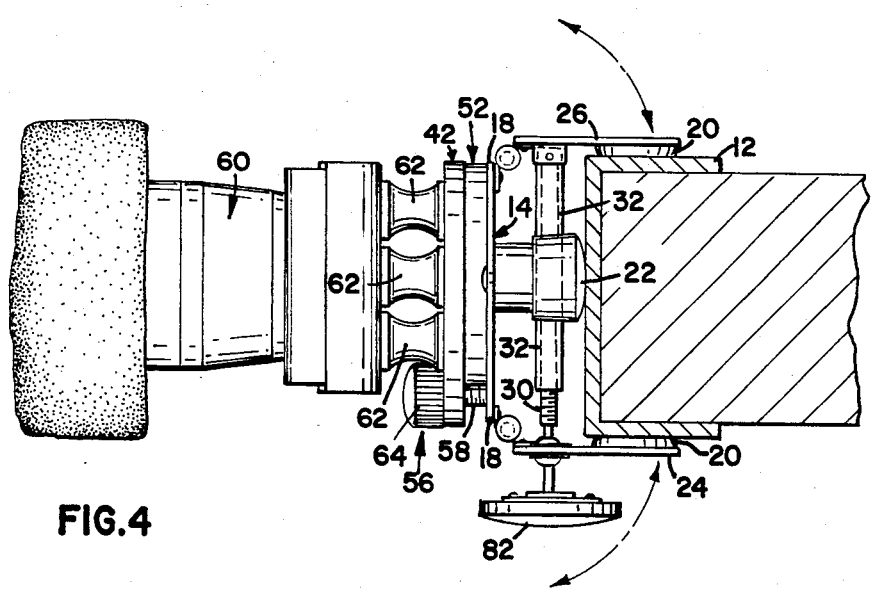
FIG. 4 is a horizontal sectional view as seen generally along line 4—4 in FIG. 3, illustrating the use of the invention with a back massager.

FIGS. 2 through 4 show another embodiment of the multi-purpose clamp 10 with an attachment; here, an electrically powered back massager 60, clamped to a door frame 12. The second and the third rigid panels 24 and 26, respectively, are hingedly attached to the first rigid panel 14. The panels 24 and 26 have again been appropriately adjusted through the adjusting means to securely clamp the door frame 12. The opposing grips 20 enhance the clamping action by allowing a better grip on the surface. Stops 22 located on the face of the first rigid panel 14 extend beyond the threaded sleeve 32 and are in contact with the door frame or supporting structure 12. In this embodiment the attachment 60 is mounted with a vibration damping means such as firm rubber piece and coils 62, which are fixed to the back side of the attachment plate. These structures include a spring encased in a rubber sleeve. Numerous alternative damping structures could be advantageously substituted. Vibration damping may be necessary with some electrical attachments.

After being rotated to the chosen position through the turntable mechanism 50, the attachment 60 is secured by the locking mechanism 56. The screw 58 is tightened with knob 64 and brought into contact with the first rigid panel 14. This embodiment lacks the notched pin/clip combination of FIG. 1. Rather, the attachment plate 42 is connected permanently to the first rigid panel 14 by a simple swivel joint such as a shoulder bolt or recessed set screw (not shown).

Figure 6:
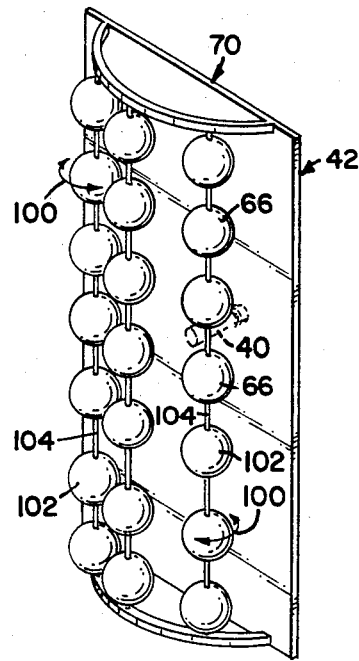
FIGS. 6 and 7 are perspective views of different attacchments that may be used in conjunction with the present ivention.
Figure 7:
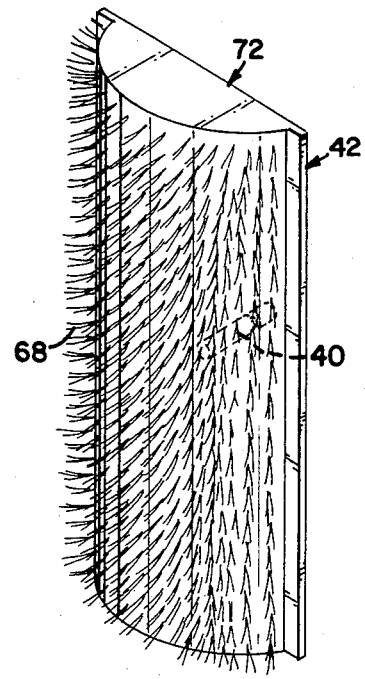

FIGS. 6 and 7 show other attachments 70 and 72, respectively, that may be used in conjunction with the multi-purpose clamp 10. FIG. 6 shows a series of rollers 66 to massage an area of the body, such as the back. FIG. 7 shows a scratching attachment or brush having bristles 68 possibly for scratching the back. Each attachment includes an attachment plate 42 and a notched pin 40 for insertion as shown in FIG. 1. These attachments 70 and 72 could be equipped with bolts or other means (not shown) for alternative affixment to the clamp 10.

FIG. 8 illustrates a portion of the preferred embodiment (see FIG. 1) on an enlarged scale. The threaded rod 30 passes through a pivoting thrust bearing 36 which is pivotally affixed to the second rigid panel 24 by an axle 74. The axle 74 is held in place, but allowed to rotate about its axis by screws 76 which are attached to panel 24. The pivoting thrust bearing 36 is held in place along the threaded rod 30 by nuts (not shown) or other devices which serve as stop means or locators.

In contrast, FIG. 5 shows an alternative device. In this embodiment, a gimbal bearing 34 includes a ball 78 which is tightly placed on a portion of the threaded rod 30 having a reduced dimension. The ball 78 will turn with the rod 30. The ball 78 turns within a slip ring 80 which is held in place against the second panel 24 by a collar 84. This arrangement, like the structure shown in FIG. 5, allows the threaded rod 30 and threaded sleeve 32 to pass directly between the second and third panels, 24 and 26, through the range of movement of the panels.

METHOD OF USE

Use of the invention will now be explained. First, the desired attachment is connected to the attachment plate 42 with or without the vibration damping means as necessary. For example, vibration damping means may be needed for some electrical attachments. The attachment plate 42 and the pad 52 are then connected to the first rigid panel 14. One embodiment of this invention depicted in FIG. 1 would make this connection by the notched pin 40 and clip 44 combination. The clip 44 is drawn back to allow the pin 40 to come through the first rigid panel 14. When the clip 44 is released, the clip 44 engages notched pin 40. This embodiment allows the user to easily change attachments for different purposes.

A different embodiment of this invention, as shown in FIGS. 2 through 4, connects the attachment plate 42 permanently to the first rigid panel 14 by a simple swivel joint. Both these embodiments have the turntable structure described above. However, it would be possible to construct the device without the turntable structure, or the attachment plate 42 could be permanently affixed to the cushioning pad 52 and to the first rigid panel 14 in one orientation. Alternatively, the attachment could be affixed directly to the first rigid panel 14 (not shown).

Once the attachment plate and accompanying attachment are secured to the first rigid panel, the clamp 10 is ready to grasp the support structure. The clamp 10 is attached to a wall surface or door frame 12 by first opening the second and third rigid panels 24 and 26, respectively. A handle 82 is turned which opens the panels 24 and 26 far enough to allow the grips 20 to pass over the edge of the surface. Next, the clamp 10 is pushed flush against the surface with the stops 22 in contact with the surface. This structure provides non-slip support in three distinct planes. The threaded rod and sleeve are then tightened to bring the second and third panels 24 and 26 together until the clamp is securely affixed to the surface. The attachment is then oriented through the turntable mechanism to the desired position and screw 58 is brought into contact with panel 14 to prevent unwanted rotation of the turntable. The attachment is now ready for use.

FIG. 5 shows a massage roller device, 70 which may advantageously be used with this invention. The roller device 70 includes a plurality of rollers 102 each affixed to an axle 104 for rotation as shown by arrows 100. When installed, the operator (not shown) may employ the device to give a pleasing massage by passing the back, or other body part, across the rollers 102. Similarly brush 72 may be used to provide a backscratch device (See FIG. 7). Either device can be turned to a proper orientation with use of the turntable mechanism 50 before or during use.

Thus, it may be seen that the present invention provides a multi-purpose clamp for clamping an attachment to a wall or door frame that has advantages over the prior art. These advantages include the fact that the clamp affixes the attachment securely to the desired surface. Moreover, the clamp allows an attachment to be rotated to a desired position by a turntable, and to be locked into that position by the locking mechansim. mechanism.

It is to be understood, however, that even though numerous characteristics and advantages of the invention have been set forth in the foregoing description together with details of the structure and function of the invention, the disclosure is illustrative only, and changes may be made in detail, especially in matters of shape, size and arrangement of parts within the principle of the invention, to the fullest extent indicated by the broad, general meaning of the terms in which the appended claims are expressed.

I claim:

1. A multi-purpose clamp for clamping an attachment to a support structure, said clamp comprising:
    (a) a first rigid panel having first and second edges, said edges being parallel and spaced apart, and a face and backside;
    (b) a second rigid panel hingedly attached to the first edge of said first rigid panel and having a face;
    (c) a third rigid panel hingedly attached to the second edge of said first rigid panel and having a face;
    (d) an adjusting means for changing and holding the angular orientation of said second rigid panel with respect to said third rigid panel from a first position wherein the sum of the opposing angles between said second rigid panel and said first rigid panel, and said third rigid panel and said first rigid panel is substantially greater than 180°, to a second position wherein said sum of the opposing angles is substantially less than 180°; and
    (e) opposing grips attached to the said faces of said second and third rigid panels.

2. The multi-purpose clamp of claim 1 wherein said adjusting means includes a threaded sleeve hingedly affixed to said third rigid panel and engaging a threaded rod pivotally attached to said second rigid panel.

3. A multi-purpose clamp for clamping an attachment to a support structure, said clamp comprising:
    a first rigid panel having first and second edges and a face and backside;
    second rigid panel hingedly attached to the first edge of said first rigid panel and having a face;
    a third rigid panel hingedly attached to the second edge of said first rigid panel and having a face;
    an adjusting means for changing and holding the angular orientation of said second rigid panel with respect to said third rigid panel from a first position wherein the sum of the opposing angles between said second rigid panel and said first rigid panel, and said third rigid panel and said first rigid panel is substantially greater than 180°, to a second position wherein said sum of the opposing angles is substantially less than 180°;
    opposing grips attached to the said faces of said second and third rigid panels;
    said adjustig means includes a threaded sleeve hingedly affixed to said third rigid panel and engaging a threaded rod pivotally attached to said second rigid panel; and
    a stop means by which said second rigid panel can move pivotally around a point on the length of said threaded rod but said rod is allowed to pivotally turn around said point.

4. The multi-purpose clamp of claim 3 further comprising steps attached to said face of said first rigid panel and extending above said threaded rod and said threaded sleeve.

5. The multi-purpose clamp of claim 3 further comprising a cushioning pad affixed to said backside of said first rigid panel.

6. The multi-purpose clamp of claim 5 further comprising an attachment plate affixed to said first rigid panel in contact with said cushioning pad.

7. The multi-purpose clamp of claim 6 further comprising a turntable means to orient said attachment to the desired position.

8. The multi-purpose clamp of claim 6 further comprising a locking means for locking said attachment plate in the chosen orientation.

9. The multi-purpose clamp of claim 6 further comprising a mounting means for mounting attachments to said clamp, said mounting means including a notched pin affixed to said attachment plate, said pin engaging a spring-loaded clip mounted on the face of said first rigid panel, to attach said attachment to said clamp.

10. The multi-purpose clamp of claim 6 further comprising a vibration damping means between said attachment and said attachment plate.

11. A multi-purpose clamp for clamping an attachment to a support structure, said clamp comprising:
    (a) a first rigid panel having first and second edges, a face and a backside;
    (b) a second rigid panel hingedly attached to the first edge of said first rigid panel and having a face;
    (c) a third rigid panel hingedly attached to the second edge of said first rigid panel and having a face;
    (d) an adjusting means for changing and holding the angular orientation of said second rigid panel with respect to said third rigid panel from a first position wherein the sum of the opposing angles between said second rigid panel and said first rigid panel, and said third rigid panel and said first rigid panel is substantially greater than 180°, to a second position wherein said sum of the opposing angles is substantially less than 180° including a threaded sleeve hingedly affixed to said third rigid panel and engaging a threaded rod pivotally attached to said second rigid panel;
    (e) opposing grips attached to said faces of said second and third rigid panels;
    (f) stops attached to said face of said first rigid panel and extending above said threaded rod and said threaded sleeve; and
    (g) a turntable means to orient an attachment to a desired position, said turntable means including a locking means to secure said chosen orientation of said attachment.

12. The multi-purpose clamp of claim 11 further comprising a cushioning pad affixed to the back side of said first rigid panel.

13. The multi-purpose clamp of claim 12 further comprising an attachment plate affixed to said first rigid panel in contact with said cushioning pad.

14. The multi-purpose clamp of claim 13 further comprising a notched pin affixed to said attachment plate, said pin engaging a spring-loaded clip mounted on the face of said first rigid panel, to attach said attachment to said clamp.

15. The multi-purpose clamp of claim 14 further comprising a vibration damping means between said attachment and said attachment plate.

* * * * *